Aug. 4, 1953

C. M. HATHAWAY 2,647,401

THERMAL FLOWMETER

Filed April 11, 1950

Inventor:
Claude M. Hathaway
By: Alois W. Graf
Attorney

Patented Aug. 4, 1953

2,647,401

UNITED STATES PATENT OFFICE 2,647,401

THERMAL FLOWMETER

Claude M. Hathaway, Littleton, Colo.

Application April 11, 1950, Serial No. 155,199

1 Claim. (Cl. 73—204)

The present invention relates to flow meters, and more particularly to a flow meter suitable for a relatively slow moving or small quantity of fluid such as the fuel in a gasoline line of an internal combustion engine.

Flow meters have been devised which are relatively accurate for large volumes and reasonably fast rates of flow, but no convenient flow meter has been available for relatively small quantities of fluid flow such as the fuel in a line to an internal combustion engine. It therefore is believed to be desirable to provide some means for indicating such flow.

It is therefore an object of the present invention to provide an improved flow meter for indicating the flow of relatively small quantities of fluid.

It is a still further object of the present invention to provide an improved flow meter for indicating the flow of fluids at a relatively low rate.

Figure 1:
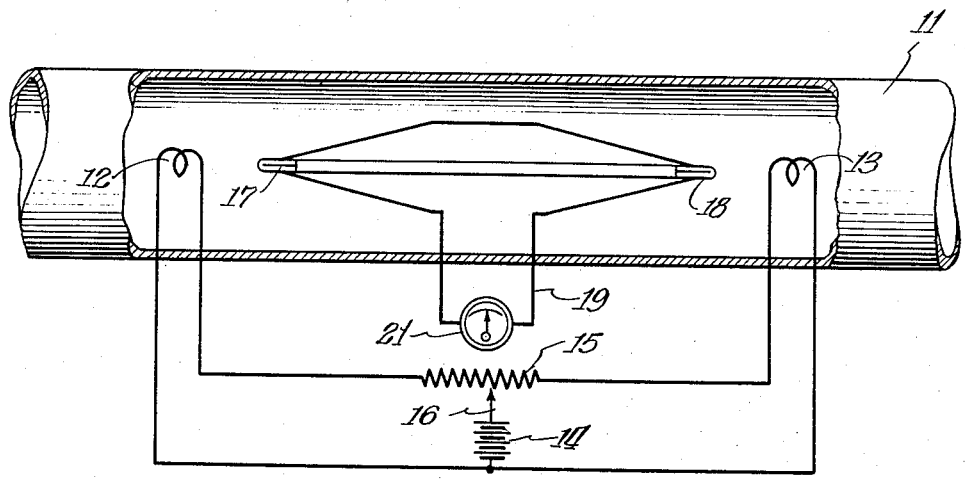
Figure 2:
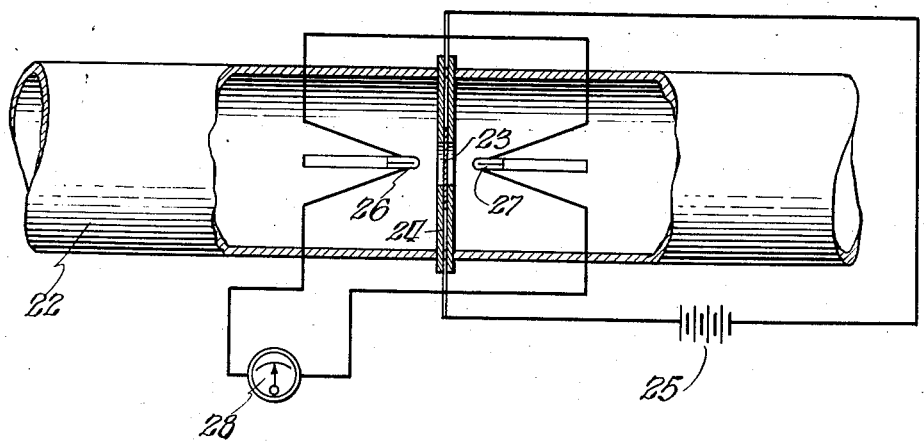

Other and further objects of the present invention subsequently will become apparent by referring to the following description taken in conjunction with the accompanying drawings, where:

Figure 1 represents diagrammatically one form of a flow meter constructed in accordance with the teaching of the present invention; and Figure 2 illustrates another embodiment of a flow meter constructed in accordance with the principles of the present invention.

Referring to Fig. 1 of the drawing, there is shown a fluid conduit 11, which along its axis at spaced apart points is provided with heating elements 12 and 13, arranged to be energized from a suitable source of current such as a battery 14. In order to provide for equal heat energy to the heating elements 12 and 13, the voltage dividing resistor 15 has an adjustable contact 16, which is connected to the source of current or battery 14.

Arranged along the axis of conduit 11 are two thermocouples 17 and 18, mounted so as to be spaced at substantially equal distances from the respective heating elements 12 and 13. The thermocouples 17 and 18 are connected in a closed circuit 19 which includes a zero center indicating instrument 21.

When there is no flow of fluid through the conduit 11, the heating elements 12 and 13 produce equal heating of the thermocouples 17 and 18 so that they generate potentials which are equal and opposite to each other, thereby producing no indication on a current meter 21. When however, there is flow of fluid in the conduit 11, as for example, from left to right, the thermocouple 17 will receive more heat than the thermocouple 18 since the heat supplied for the latter thermocouple by the heating element 13 is being moved toward the right by the heated fluid. By suitable calibration the meter 21 can indicate directly the rate of flow of fluid through the conduit 11.

Now the manner of providing a fluid flow indication is such that wherein the fluid conduit 22 is provided with a heating element 23 which may be mounted in a baffle 24 so as to concentrate the heat to a relatively small cross-sectional area at the axis of the conduit 22. The heating element 23 is connected in an electrical circuit to a suitable source of potential such as a battery 25.

Two thermocouples 26 and 27 are located equal distances from opposite sides of the heating element 23. The thermocouples 26 and 27 are connected in closed circuit which includes a zero center indicating instrument 28. With no fluid passing through the conduit 22, the heating element 23 produces equal heating of the thermocouples 26 and 27 so that no indication is produced on the instrument 28 since the thermocouples are connected in an electrical opposition to each other.

Upon the occurrence of any fluid flowing through the conduit 22, the thermocouples in the direction of the flow of fluid with respect to the heating element 23, will be heated to a greater extent than the other thermocouple and hence this may be indicated directly upon suitable calibration by the instrument 28.

The amount of heat provided for either of the arrangements illustrated in Figures 1 and 2, is relatively small and need only be sufficient to produce some potential change of the thermocouples whenever fluid flow occurs.

While for the purpose of illustrating and describing the present invention, certain preferred embodiments have been illustrated in the drawings, it is to be understood that the invention is not to be limited thereby, since such variations are contemplated as may be commensurate with the scope and spirit of the invention as set forth in the accompanying claim.

I claim:

A flow meter for relatively small quantities of fluid comprising a conduit, a pair of electrical heating elements for supplying heat at two spaced points along and in the vicinity of the axis of said conduit, a pair of thermocouples arranged symmetrically between and with respect to the said heating elements, and being spaced along the axis of said conduit, a circuit for said thermocouples and including indicating means for producing an indication of the rate of flow of said fluid.

CLAUDE M. HATHAWAY.

References Cited in the file of this patent

UNITED STATES PATENTS

| Number | Name | Date |
| --- | --- | --- |
| 946,886 | Thomas | Jan. 18, 1910 |
| 1,193,488 | Thomas | Aug. 1, 1916 |
| 1,476,762 | Meyer et al. | Dec. 11, 1923 |
| 1,890,985 | Hamblen et al. | Dec. 13, 1932 |
| 2,197,818 | Tozier | Apr. 23, 1940 |
| 2,525,197 | Beams et al. | Oct. 10, 1950 |